L. A. WHARRAD.
MANUFACTURE OF FISH HOOKS, NEEDLES, AND OTHER ARTICLES.
APPLICATION FILED JAN. 6, 1913.
1,098,198.
Patented May 26, 1914.
2 SHEETS—SHEET 1.
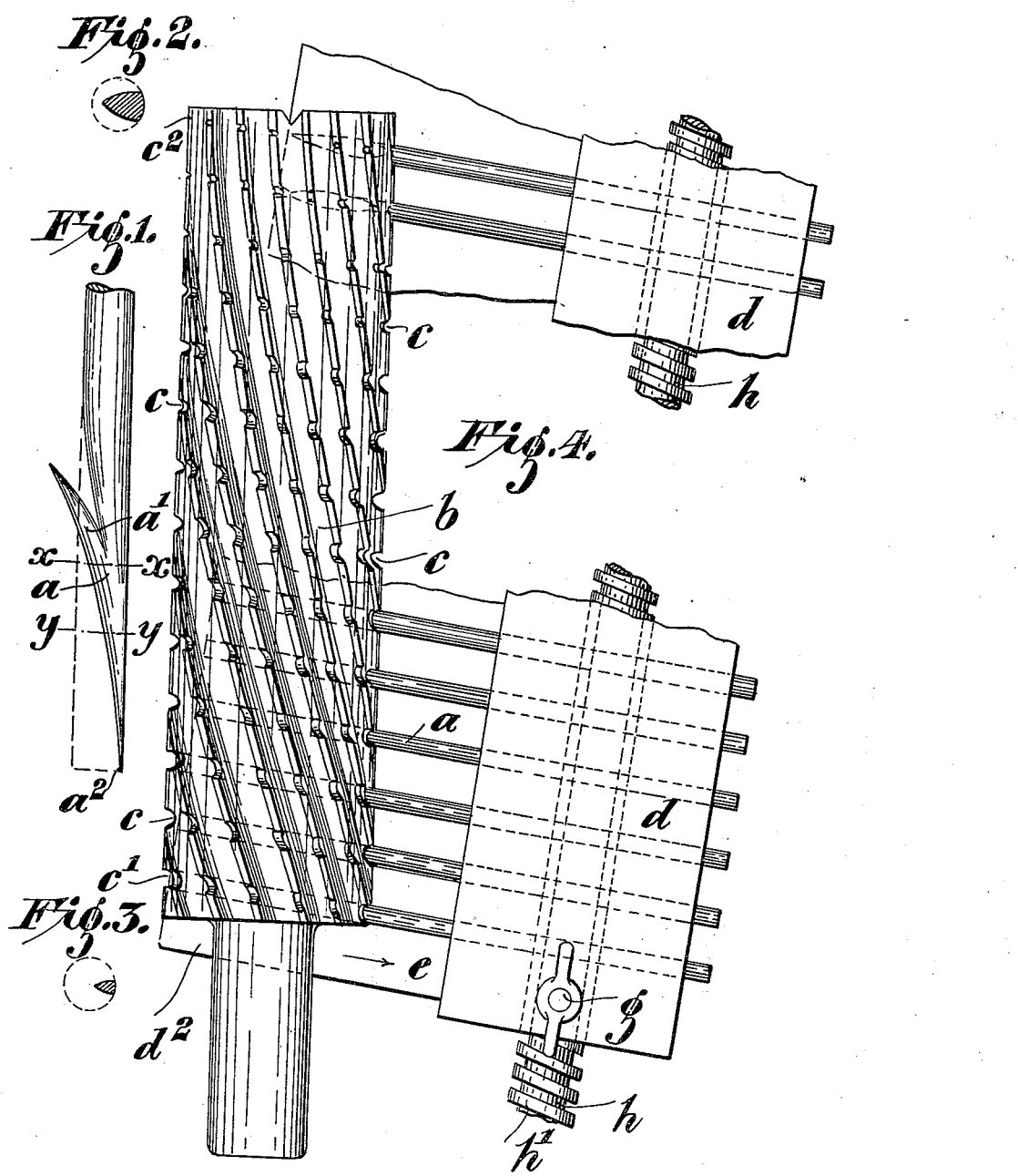

L. A. WHARRAD.
MANUFACTURE OF FISH HOOKS, NEEDLES, AND OTHER ARTICLES.
APPLICATION FILED JAN. 6, 1913.
1,098,198.
Patented May 26, 1914.
2 SHEETS—SHEET 2.
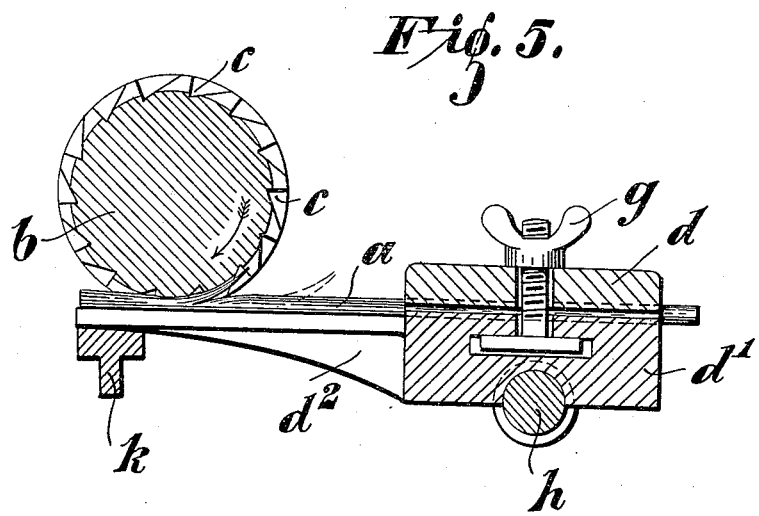
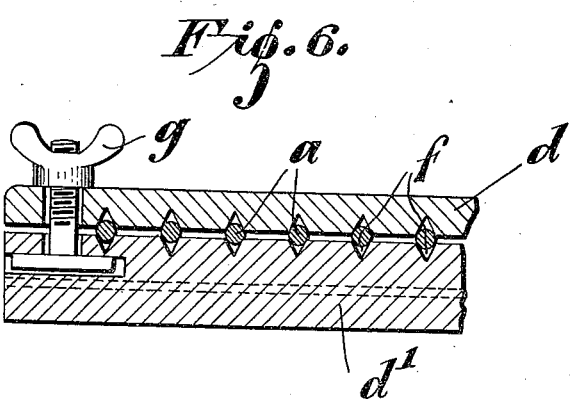

UNITED STATES PATENT OFFICE.

LIONEL ALFRED WHARRAD, OF REDDITCH, ENGLAND, ASSIGNOR TO WHARRAD ENGINEERING COMPANY LIMITED, OF REDDITCH, ENGLAND.

MANUFACTURE OF FISH-HOOKS, NEEDLES, AND OTHER ARTICLES.

1,098,198. Specification of Letters Patent. Patented May 26, 1914.

Application filed January 6, 1913. Serial No. 740,462.

*To all whom it may concern:*

Be it known that I, LIONEL ALFRED WHARRAD, a subject of the Kingdom of Great Britain, residing at 8 Victoria street, Redditch, in the county of Worcester, England, engineer, have invented certain new and useful Improvements in the Manufacture of Fish-Hooks, Needles, and other Articles, of which the following is a specification.

This invention comprises improvements in the manufacture of fish hooks, needles and other articles having a part of elliptical or like section; and has for its object to provide a means of manufacture whereby the elliptical part may be shaped by mechanical or automatic means in an exceedingly efficient and cheap manner.

My invention is particularly applicable to the manufacture of a barbed fish hook. Such fish hooks are usually made from a length of wire the barb being produced by a chisel cut, the chisel entering the wire at an angle and raising up the barb. After the barb has been so produced the part in front of it is still of the same diameter say $\frac{1}{8}$ of an inch, this part being required to be pointed or shaped to an oval or elliptical section. Heretofore it has been the practice to do this wholly or partly by hand which is very expensive.

By this invention means are provided whereby this part may be shaped and finished by a mechanical process.

In order that this invention may be clearly understood and easily carried into practice I have appended hereunto two sheets of drawings, upon which:—

Figure 1 is a view of the barbed end of a fish hook for illustrating the pointing or shaping required by this process. Fig. 2 is a cross section through Fig. 1 on the line $x$—$x$. Fig. 3 is a similar cross section to that of Fig. 2 but on the line $y$—$y$. Fig. 4 is a plan of the cutting tool showing the means for gripping and feeding the hooks to the tool. Fig. 5 is a cross section through Fig. 4. Fig. 6 is a part longitudinal section through the grippers.

According to this invention an improved cutting tool $b$ somewhat like a hob is employed. This tool $b$ is preferably cylindrical, but it may be of taper form and starting from one end a spirally arranged cutting groove such as $c$ is formed in same, such cutting groove commencing at $c^1$ of the same width as the elliptical part $a^1$ of the hook $a$ Fig. 1, and gradually decreasing in width to the other end where the two sides of the groove practically meet to form the point $a^2$ on the extreme end of the hook. A number of longitudinal grooves are preferably provided in the tool like a milling cutter in the divisions between which the cutting edges of the spiral groove are formed. Suitable sliding gripping means $d$ are provided which hold the hooks $a$ and carry them along the cutting tool $b$ or the cutting tool may itself move endwise.

In operation the hook is placed, barb upward, in engagement with the wide end $c^1$ of the groove and obviously when the tool is rotated it cuts away the surplus metal in the hook and if the hook is moved endwise in the direction of the arrow $e$ along the spiral groove it is clear that as the width of the groove decreases so will the hook be narrowed or cut away to a point. If so desired the narrow end $c^2$ of the cutting groove may be finished with a "file" or a grinding surface for the purpose of producing a finer and sharper point, and in cases where the tool is of taper form the smaller diameter may be arranged at the one end so as to expose the extreme point of the hook to a lesser portion of the circumference of the tool than is the case in the previous part of the operation, while the other end may be of a suitable diameter for the circumference to form the outer curve between the barb and the point. Any suitable form of traveling gripper may be employed as for example the plate $d$ and slide $d^1$ which are provided with slots $f$ between which the hooks are placed and clamped by the clamping nuts $g$. The gripper $d^1$ is mounted to have an endwise traveling movement, such movement being effected by a screw $h$ which is so geared in relation to the tool $b$ as to cause the hooks to travel in a lateral direction proportionately to the spiral formation of the cutting grooves of the tool. The hooks $a$ are preferably arranged parallel with the spiral groove, while to allow of such arrangement the grippers $d$ are arranged at an angle to the tool $b$ in such a manner that as the hooks travel in a transverse direction they are also gradually moved endwise to effect the required cutting operation between the barb and the point as before described.

The gripping members *d* and operating screw may be made to be capable of being tilted at the end where the hooks are receiving their finishing process, so as to enable the position of the hooks to be adjusted with regard to the cutting parts of the tool in which case the screw rod *h* would be provided at the end $h^1$ with a universal joint. An extending table $d^2$ is provided upon the slide $d^1$ for the support of the ends of the hooks while being operated upon by the cutters, such extending table being also supported by a fixed part *k*.

What I claim as my invention and desire to secure by Letters Patent is:—

1. A machine for making fish-hooks, needles and similar articles, comprising in combination, a circular rotatable cutting member, having spiral ribs disposed in a longitudinal direction thereof, a helical groove cut in said cutting member, a table plate having means thereon for maintaining the stock in working position, and means whereby said table plate is caused to move in an angular longitudinal direction with respect to the axis of said cutting member.

2. A machine for making fish-hooks, needles and similar articles, comprising in combination, a circular rotatable cutting member, having spiral ribs disposed in a longitudinal direction thereof, a groove, varying in depth, cut in a helical path around said cutting member, a table plate having means thereon for clamping the stock in working position with respect to said cutting member, and means whereby said table plate is caused to move so that the stock travels in said groove.

3. A machine for making fish-hooks, needles and similar articles, comprising in combination, a cylindrical rotatable cutting tool having a helical groove on its outer surface, a clamping device having means for supporting the stock to be cut by said cutting member, and a shaft, on which said device is supported, having its axis at an angle to the axis of said cutting member and provided with means for feeding said device longitudinally of said shaft.

4. A machine for making fish-hooks, needles and similar articles, comprising in combination, a cylindrical rotatable cutting tool, having on its surface spiral ribs longitudinally thereof, and a helical groove cut therein of variable width, a clamping device to guide the stock to be worked, in the helical groove, a table plate for holding said clamping device having its axis disposed at an angle to the axis of said cutting tool, and screw and nut means for feeding said stock along said helical groove.

5. A machine for making fish hooks, needles, and similar articles comprising in combination, a cylindrical rotatable cutting tool having spiral ribs thereon sharpened at one edge, and a helical groove cut therein of variable width, the edges of said grooves being sharpened, a clamping device to guide the stock in the path of said helical groove, a table structure for holding said clamping device and having its axis disposed at an angle to the axis of said rotatable cutting tool, and screw and nut means for feeding said stock along said helical groove.

6. A machine for making fish hooks, needles and similar articles comprising in combination, a rotatable member having a helical cutting groove of varying depth thereon, a table plate for supporting the stock to be cut, and means for adjustably holding said stock in working position on said plate.

In witness whereof I have hereunto set my hand in the presence of two witnesses.

LIONEL ALFRED WHARRAD.

Witnesses:
 ALFRED OWEN ROBINSON,
 THOMAS HENRY POOLE.

---

Copies of this patent may be obtained for five cents each, by addressing the "Commissioner of Patents, Washington, D. C."